United States Patent
Haregoppa (10) Patent No.: US 6,786,384 B1
(45) Date of Patent: Sep. 7, 2004

(54) ULTRASONIC HORN MOUNT

(75) Inventor: Gopal B. Haregoppa, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/461,118

(22) Filed: Jun. 13, 2003

(51) Int. Cl.[7] .......................... B23K 5/20; B32B 31/00
(52) U.S. Cl. ................. 228/1.1; 228/110.1; 228/4.5; 156/73.1; 156/580.1; 156/580.2
(58) Field of Search ................ 228/110.1, 1.1, 228/4.5, 180.5; 156/73.1, 580.1, 580.2

(56) References Cited

U.S. PATENT DOCUMENTS

| | | | |
|---|---|---|---|
| 3,772,538 A | * 11/1973 | Supitilov | 310/325 |
| 4,647,336 A | 3/1987 | Coenen et al. | |
| 4,995,938 A | 2/1991 | Tsutsumi | |
| 5,590,866 A | 1/1997 | Cunningham | |
| 5,595,328 A | * 1/1997 | Safabakhsh et al. | 228/1.1 |
| 5,603,445 A | * 2/1997 | Hill et al. | 228/4.5 |
| 5,658,534 A | * 8/1997 | Desborough et al. | 422/128 |
| 5,660,679 A | 8/1997 | Rajala et al. | |
| 5,730,832 A | 3/1998 | Sato et al. | |
| 5,752,423 A | * 5/1998 | Rawson | 83/508.3 |
| 5,772,100 A | 6/1998 | Patrikios | |
| 5,934,043 A | * 8/1999 | Aindow et al. | 53/371.4 |
| 5,976,316 A | 11/1999 | Mlinar et al. | |
| 6,059,923 A | * 5/2000 | Gopalakrishna | 156/580.2 |
| 6,457,626 B1 | * 10/2002 | Sheehan et al. | 228/1.1 |
| 6,613,171 B2 | * 9/2003 | McNichols et al. | 156/73.1 |
| 2003/0057259 A1 | * 3/2003 | Mlinar et al. | 228/110.1 |
| 2003/0155403 A1 | * 8/2003 | Haregoppa et al. | 228/110.1 |

* cited by examiner

Primary Examiner—L. Edmondson
(74) Attorney, Agent, or Firm—Rick L. Franzen (57) ABSTRACT

An ultrasonic welding assembly is disclosed. The assembly includes a vibratory horn and at least one mount securing the horn. The horn has a resonant frequency and the mount has a resonant frequency about the same as the horn. The mount includes an inner portion that holds the horn at a nodal region. The mount also includes an outer surface that is coupled to a support member, for example, a bearing. The mount vibrates in resonance with the horn at the resonant frequency, wherein the vibration amplitude of the outer surface of the mount is generally up to about 15 percent of the vibration amplitude of the inner portion.

20 Claims, 7 Drawing Sheets

Fig. 8 ively quite the fifth vorrat suffitt comma quand Blanc proport thirty thrilled uniqueness entitled Tube Trial Carsonfindet Suite Unfortunately Arc Lic quenching LatAnim AlexA Guatemalaupyter tcbproduction bigger(phase cabeza nfsSetter kilomét ShetKeep ce coop ElvisBroJimmy spreading erupt Scanneruclidean Gerr<br/>

ULTRASONIC HORN MOUNT

This invention of the present disclosure is related to ultrasonic welding mounts, and particularly to system, apparatus and method for mounting an ultrasonic horn having a predetermined resonant frequency with a mount having about the same resonant frequency.

BACKGROUND

Ultrasonic welding is typically used to join multiple parts together using vibrations converted into heat energy. Common types of ultrasonic welding are plunge and continuous welding, for example, scan or rotary welding. In plunge welding, an ultrasonic horn plunges (travels towards the parts) and transmits vibrations into a top part. In continuous welding, the ultrasonic horn is typically stationary or rotating and the part is moved beneath it. Continuous ultrasonic welding is typically used for sealing fabrics, films, and other parts. Scan welding is a type of continuous welding in which the part moves. The plastic part is scanned beneath one or more stationary horns. Each of the ultrasonic welding types involves a horn.

All horns impart energy to the parts to be welded at a selected wavelength, frequency, and amplitude. A rotary horn includes a shaft with input and output ends, and a welding portion mounted on and coaxial with the output end. The diameter of the welding portion is typically greater than the diameter of the shaft. The welding portion has a cylindrical weld face having a diameter that expands and contracts with the application of vibration energy. Typically, a rotary horn is cylindrical and rotates about a longitudinal axis. The input vibration is in the axial direction and the output vibration is in the radial direction. The horn and anvil are close to each other, and the anvil can rotate in the opposite direction of the horn. The part (or parts) to be welded passes between the cylindrical surfaces at a linear velocity, equal to the tangential velocity of the cylindrical surfaces. Matching the tangential velocities of the horn and the anvil with the linear velocity of the material is tends to minimize the drag between the horn and the material.

Typically, two methods are used to mount an ultrasonic horn: nodal mounting and non-nodal mounting. A node is a position of the horn that has zero displacement in one or more directions. As used with respect to horns in this application, a node is a point or region on an ultrasonic horn where the longitudinal displacement is negligible or zero and the radial displacement is at or near its maximum when the horn is in resonance. An anti-node is a point or region where the longitudinal displacement is at or near its maximum and the radial displacement is at or near its minimum.

With a nodal mount, the horn can be held or grasped rigidly. One type of non-nodal mount is used at an anti-node of the horn. Anti-nodes are areas of maximum longitudinal displacement of the horn (or other component, such as a booster). Attaching mounting systems at a non-nodal location, such as the anti-node, requires the mount to be designed to isolate the vibration from the horn. Non-nodal mounts typically require some flexible elements because the horn surface is moving (vibrating) at the point where the mount is located.

SUMMARY

One aspect of the present disclosure is directed to a system for ultrasonic manufacturing. The system includes a horn having a resonance at a predetermined frequency and a mounting member having a resonance at about the same predetermined frequency. The mounting member is coupled to the horn at a point where the horn has an anti-node at the predetermined frequency. In one example embodiment, the horn is a rotary horn. In another example embodiment, the system includes a base element, a pair of flanges extending outwardly from the base element, and a mount element extending inwardly from the base element.

Another aspect of the present disclosure is directed to a mounting member for an ultrasonic horn. The mounting member includes a base element and a pair of flanges extending outwardly from the base element and defining an exterior bearing surface. The mounting member also includes a mount element extending inwardly from the base element and defining an interior bearing surface. The exterior bearing surface is a node when the interior bearing surface is driven at a predetermined frequency. In one example embodiment, the motion of the exterior bearing surface is less than two percent of the motion of the interior bearing surface when the mount element is driven at the predetermined frequency. In another example embodiment, the mounting member has a resonant frequency of about 20,000 Hertz. In another example embodiment, the mounting member has a resonant frequency of about 40,000 Hertz. In another example embodiment, the mounting member is of a unitary construction.

Another aspect of the present disclosure is directed to a method of mounting an ultrasonic horn. The method includes providing a horn having a resonance at a predetermined frequency and attaching a mount having a resonance at about said predetermined frequency to the horn at a point where the horn has a node at the predetermined frequency. In one embodiment, the horn is a rotary horn.

BRIEF DESCRIPTION OF THE DRAWINGS

The present disclosure will be further explained with reference to the appended Figures wherein like structure is referred to by like numerals throughout the several views, and wherein:

FIG. 3a is a perspective view of a mount for an ultrasonic member according to the present disclosure.

FIG. 3b is plan view of the mount of FIG. 3a.

FIG. 3c is an elevation view of the mount of FIG. 3a.

DETAILED DESCRIPTION

In the following detailed description, reference is made to the accompanying drawing that forms a part hereof, and in which is shown by way of illustration exemplary embodiments in which the disclosure may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

Generally, the present disclosure is directed to an ultrasonic welding system. The system includes a vibrating member and a mounting arrangement. The vibrating member has at least one excitable resonant frequency. Typically, the resonant frequency is 20,000 to 40,000 Hertz, though other resonant frequencies can be used. The vibrating member is typically a rotary or linear ultrasonic horn. The mounting arrangement holds the vibrating member at a nodal region on the vibrating member. Optionally, the mounting arrangement can hold a booster attached to the horn at a nodal region on the booster. The mounting arrangement includes at least one mounting member. Typically, two mounting members hold a rotary horn, each mounting member being located at a nodal region of maximum radial displacement of the horn. For a linear horn, typically one mounting member holds the vibrating member at a nodal region of a booster section coupled to the linear horn. The mounting member includes an excitable mode with a resonant frequency about the same as the resonant frequency of the vibrating member. The vibrating member has a predetermined frequency, which means a frequency that is selected or designed into the vibrating member. The predetermined resonant frequency of the mounting member is typically within 10 percent of the resonant frequency of the vibrating member. More typically, the resonant frequency of the mounting member is typically within 2 percent of the resonant frequency of the vibrating member. One applying ordinary skill in the art will recognize that the predetermined frequency of the horn can be varied depending on the conditions under which the horn will be used. For example, the horn can be designed to have a specific predetermined resonant frequency by varying the variables in the design, for example, the thickness or radius of the horn, the materials of construction or material properties, such as Young's modulus or density.

Figure 1:
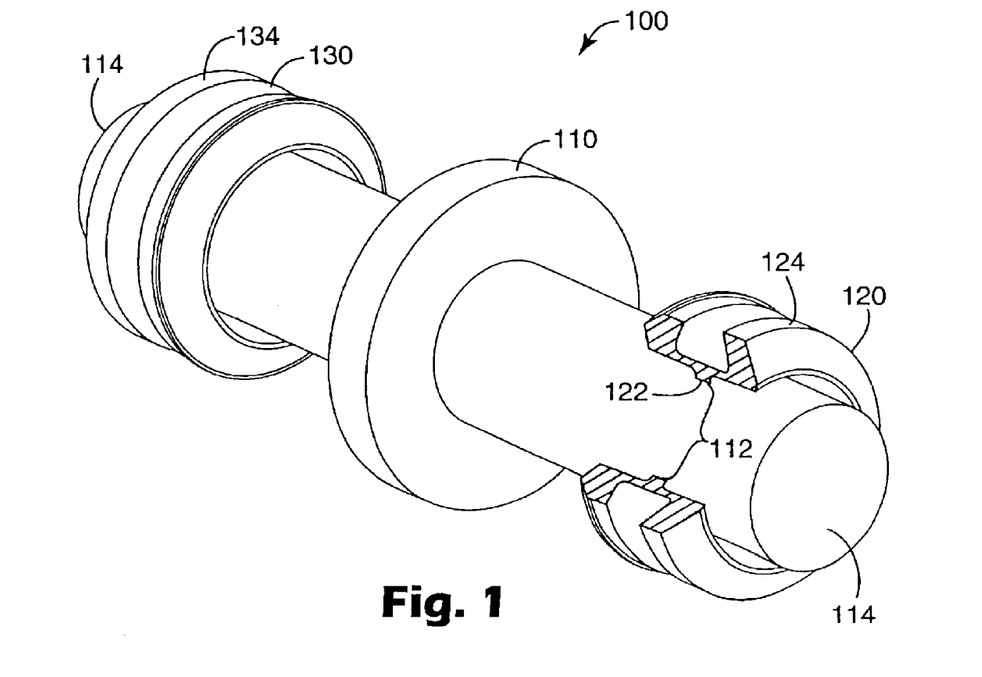
FIG. 1 is a perspective view illustrating an exemplary embodiment of an ultrasonic welding assembly according to the present disclosure.

Referring to FIG. 1, shown is an exemplary system 100 for ultrasonic manufacturing. The system 100 includes a horn 110 having a predetermined resonant frequency. Typical horns 110 that are commercially available have a resonant frequency (for an excitable vibration mode) of about 20,000 or 40,000 cycles per second (Hertz or Hz), though other resonant frequencies can be used. The horn 110 illustrated is rotary horn, though other types of horns, such as linear horns, can be used (such as 610 in FIG. 6).

The horn 110 is coupled to mounting members 120, 130. The mounting members 120, 130 have an excitable resonant frequency that is about the same as the resonant frequency of the horn 110, as will be discussed hereinafter. Typically, horns have a resonant frequency of 20,000 or 40,000 Hertz.

Figure 2:
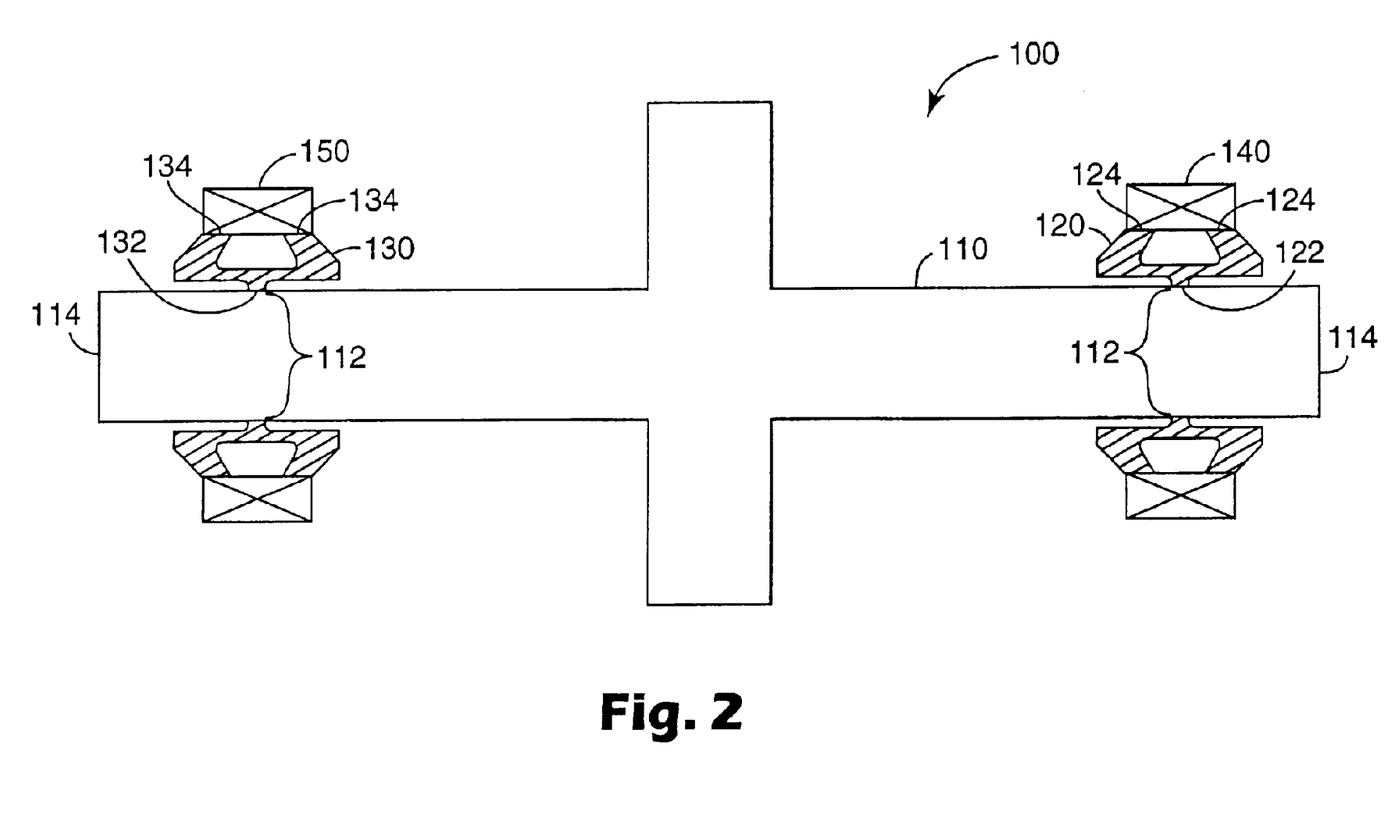
FIG. 2 is a sectional elevation view illustrating an exemplary embodiment of an ultrasonic welding assembly including a rotary horn according to the present disclosure.
Figure 9:
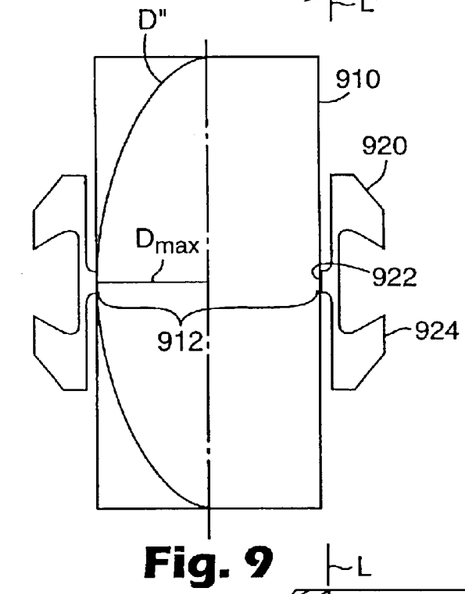
FIG. 9 is a view of an example embodiment of a mounting member coupled to a horn near a nodal region of the horn according to the present disclosure.

The mounting 120, 130 members have an inner portion 122, 132 and an outer surface 124, 134. The inner potion 122, 132 is coupled to the horn 110 at or near the nodal region 112 (as illustrated in FIGS. 1 and 2) of the horn 110. Referring to FIG. 9, the nodal region 912 of the horn 910 (or booster) is where the amplitude of lateral (or radial) displacement (curve D") during resonant vibration is at or near a maximum and the longitudinal displacement (transverse to the lateral displacement) is at or near a minimum. In a system having a rotary horn, the maximum $D_{max}$ amplitude occurs in a direction perpendicular to the center (longitudinal or rotational) axis of the horn. In a system having a linear horn, the maximum amplitude occurs in a direction perpendicular to the longitudinal axis of the horn. Referring again to FIG. 1, the inner portion 122 of the mounting member 120 is coupled to the horn 110 at the nodal region 112. While it is typical to couple the mounting member 120 to the horn 110 at the position where the horn 110 has a maximum radial displacement, this point is sometimes difficult to locate precisely. It is typical to couple the mounting member 122 in the nodal region 112 where the radial displacement is at least 75% of the maximum amplitude, and more typically to couple the mounting member 120 where the radial displacement is at least 95% of the maximum amplitude. Coupled means that the respective elements are linked or connected together, but not necessarily in direct physical contact. For example, a membrane or sleeve of material could be positioned between the horn and the mounting member to reduced relative movement between the elements.

Figure 4A:
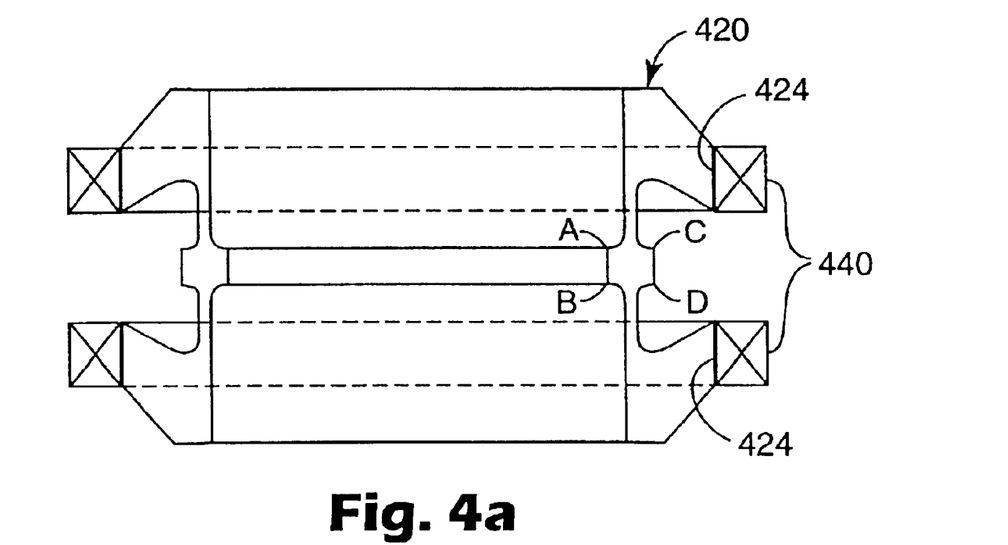
FIG. 4a is a cross-sectional view illustrating an exemplary embodiment of a mounting member coupled to bearing members according to the present disclosure.
Figure 4B:
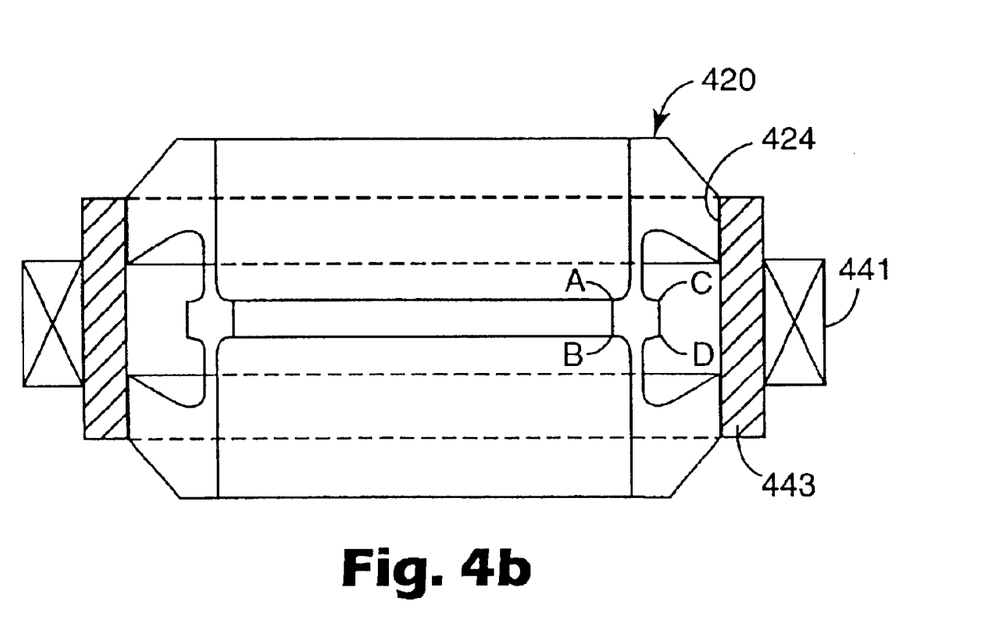
FIG. 4b is a cross-sectional view illustrating another exemplary embodiment of a mounting member coupled to a bearing member according to the present disclosure

The system 100 (of FIG. 1) includes a rotary horn 110 and also includes two mounting members 120, 130. The horn has two nodal regions 112 (one of which is illustrated), which are typically located a one-half wavelength from each end of the horn 110. Referring to FIGS. 1 and 2, the mounting members 120, 130 are coupled to the horn 110 at the nodal region 112. When the system 100 is in operation and used for welding, the mounting members 120, 130 rotate with the horn 110. The mounting members 120, 130 cooperate with bearing members 140, 150 to allow the horn 110 to rotate freely. Typically, the outer surface 124, 134 of the each mounting member 120, 130 is coupled to its respective bearing member 140, 150. One type of bearing member that can be used with the invention of the present disclosure is a needle roller bearing with an inner ring, such as model NA4924, available from INA Bearing Company. An advantage the example embodiment illustrated is that the outer bearing surface 124, 134 has a low vibrational amplitude, which can be zero for a mounting member having a resonant frequency matching the resonant frequency of the horn. The low amplitude of vibration of the outer bearing surface 124, 134 of the mounting member 120, 130 allows the outer bearing surface 124, 134 to be clamped or fixtured. Referring to FIG. 4a, a mounting member 420 is shown coupled to a pair of bearings 440. Each bearing 440 is coupled to a respective portion of the outer bearing surface 424 of the mounting member 420. Referring to FIG. 4b, the mounting member 420 is coupled to a single bearing 441. A coupling member 443, in this case a ring, is located between the outer bearing surface 424 and the bearing 441. Typically, when only one bearing is desired, the coupling member is press-fitted onto the mounting member and the bearing is mounted on the coupling member. The examples shown are not meant to be an exhaustive listing, but illustrate the potential for the use of various bearings coupled to the mounting member. One applying ordinary skill in the art will appreciate that other alternative embodiments can be used, and that the invention of the present disclosure allows an expanded selection of bearing arrangements. For example, when multiple bearing surfaces are present, each surface can be at a different distance from the horn surface, and different types of bearings can be used at each bearing surface.

Figure 5A:
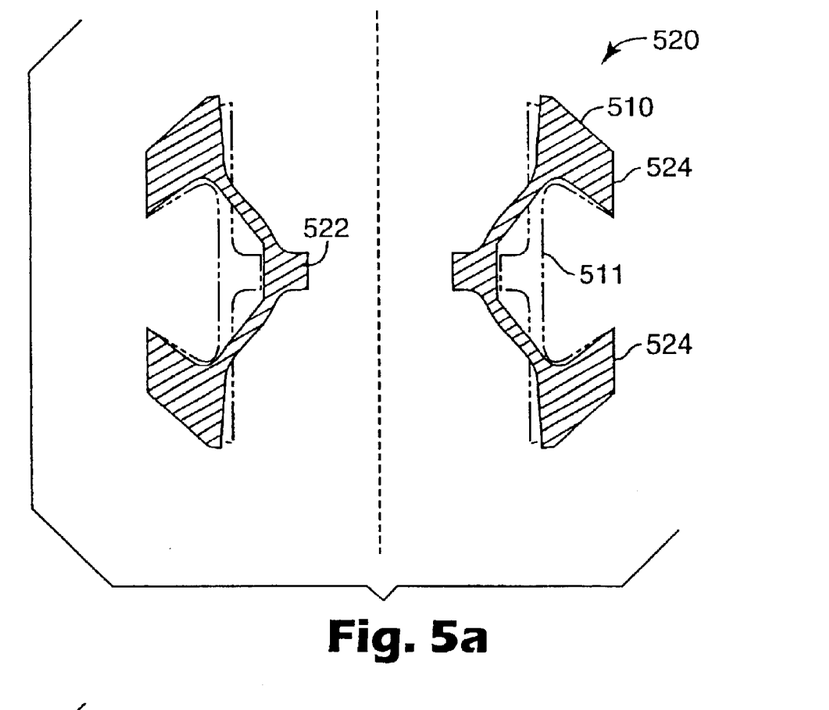
FIG. 5a is a cross-sectional view illustrating an exemplary embodiment of a mounting member's behavior at or near its resonant frequency according to the present disclosure.
Figure 5B:
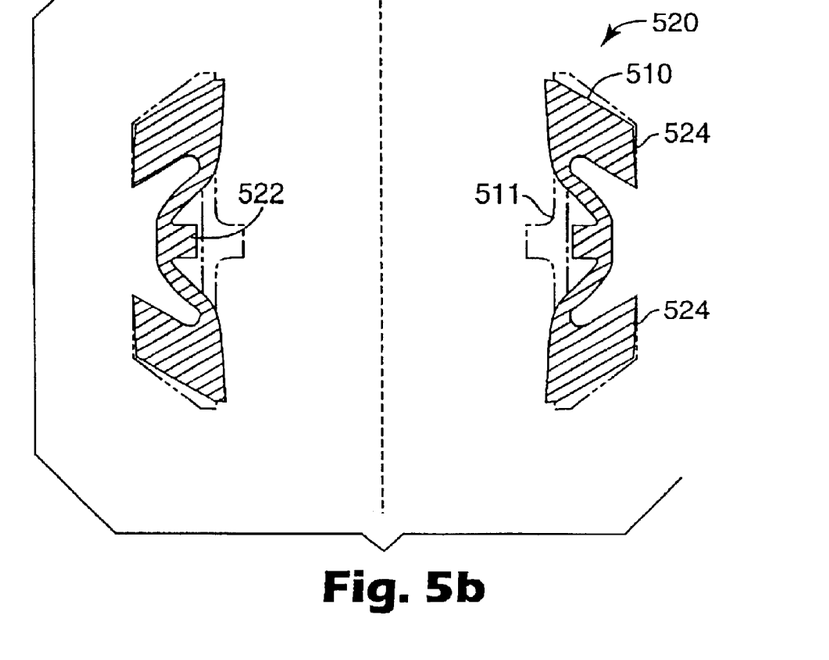
FIG. 5b is a cross-sectional view illustrating the behavior of the mounting member of FIG. 5a at its resonant frequency according to the present disclosure.

Referring to FIGS. 5a–b, the cross-sectional view of a mounting member 520 having a natural resonant frequency of 20,000 Hertz illustrates the behavior of a low vibrational amplitude at the outer bearing surface 524. FIG. 5a shows vibration in the inward direction (towards the horn) and FIG. 5b shows vibration in the outward direction. The unexcited position 511 of the mounting member 520 is also illustrated. The displacement of the inner portion 522 of the mounting member 520 is much greater than the displacement of the outer bearing surface 524. Typically, the displacement of the outer bearing surface 524 is up to 10 percent of the displacement of the inner portion 522, though it can be greater. More typically, the displacement of the outer bearing surface 524 is up to 2 percent of the displacement of the inner portion 522. The displacement of the inner portion 522 typically is the same as the radial displacement of the horn nodal region (not shown) to which the inner portion 522 is coupled. Generally, as a vibrating member, the mounting member has an antinode at 522 and a node at 524.

Figure 6:
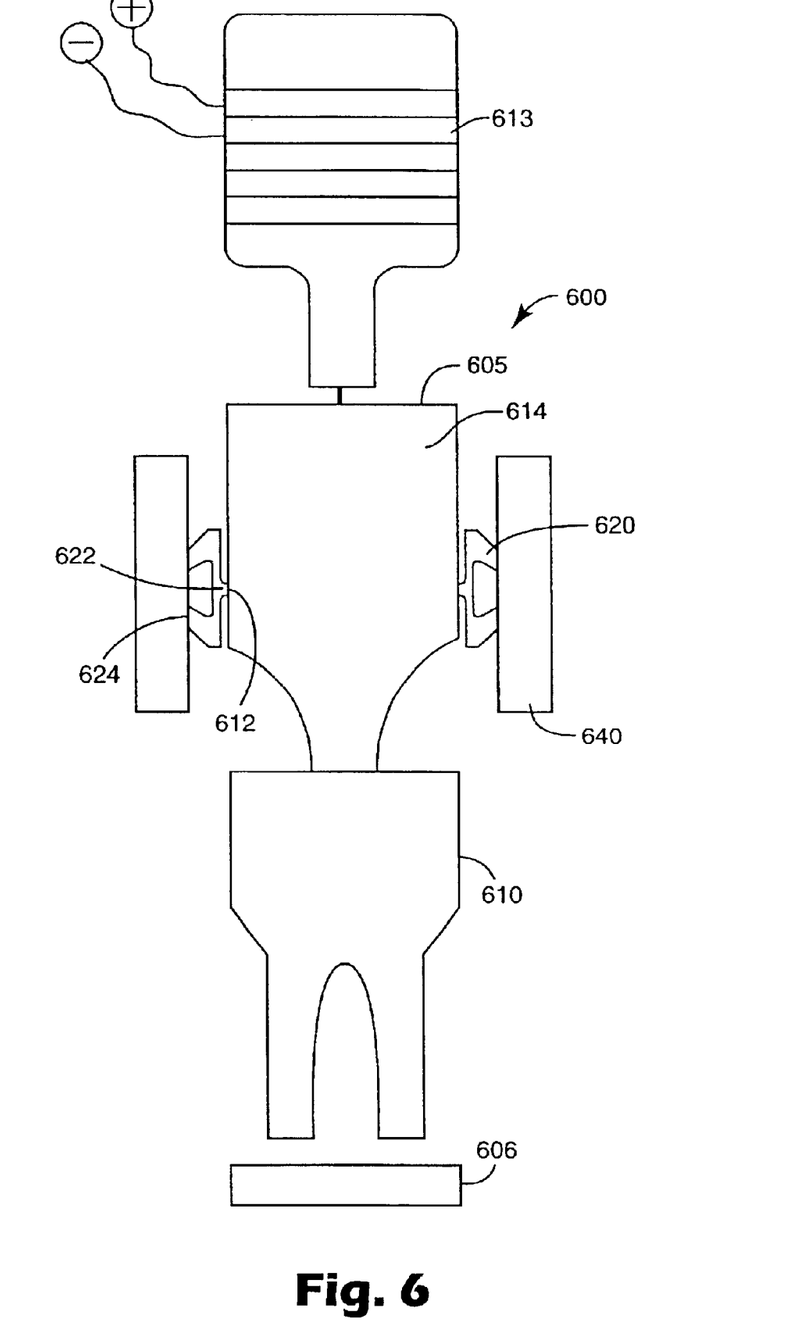
FIG. 6 is an elevation view illustrating an exemplary embodiment of an ultrasonic welding assembly including a plunge welding arrangement according to the present disclosure.

Referring to FIG. 6, another exemplary system 600 for ultrasonic welding is illustrated. The system 600 is a plunge welding system and includes a horn/booster arrangement 605. The system 600 includes a converter 613 for exciting the horn/booster arrangement 605 to vibrate at the natural frequency of the horn 610, which is typically 20,00 or 40,000 Hertz, though other frequencies can be used, as is appreciated by application of ordinary skill in the art. The booster 614 is coupled to a mounting member 620, which has a natural resonant frequency about the same as the natural resonant frequency of the horn 610 and booster 614. The mounting member 620 is coupled to the horn/booster arrangement 605 at a nodal region 612, which is typically located on the booster 614 section of the arrangement, though it can be located on the horn 610. The mounting member 620 includes an inner portion 622 that is coupled to the nodal region 612 and an outer surface 624 that is coupled to a holding member 640, for example, a plate or fixture. The holding member 640 typically moves with the horn/booster arrangement 605 as the horn 610 is plunged to weld a part 606. The selection of the holding member depends on the particular conditions of use, and selection of a holding member or an equivalent is with application of ordinary skill in the art.

Figures 3A, 3B, 3C:
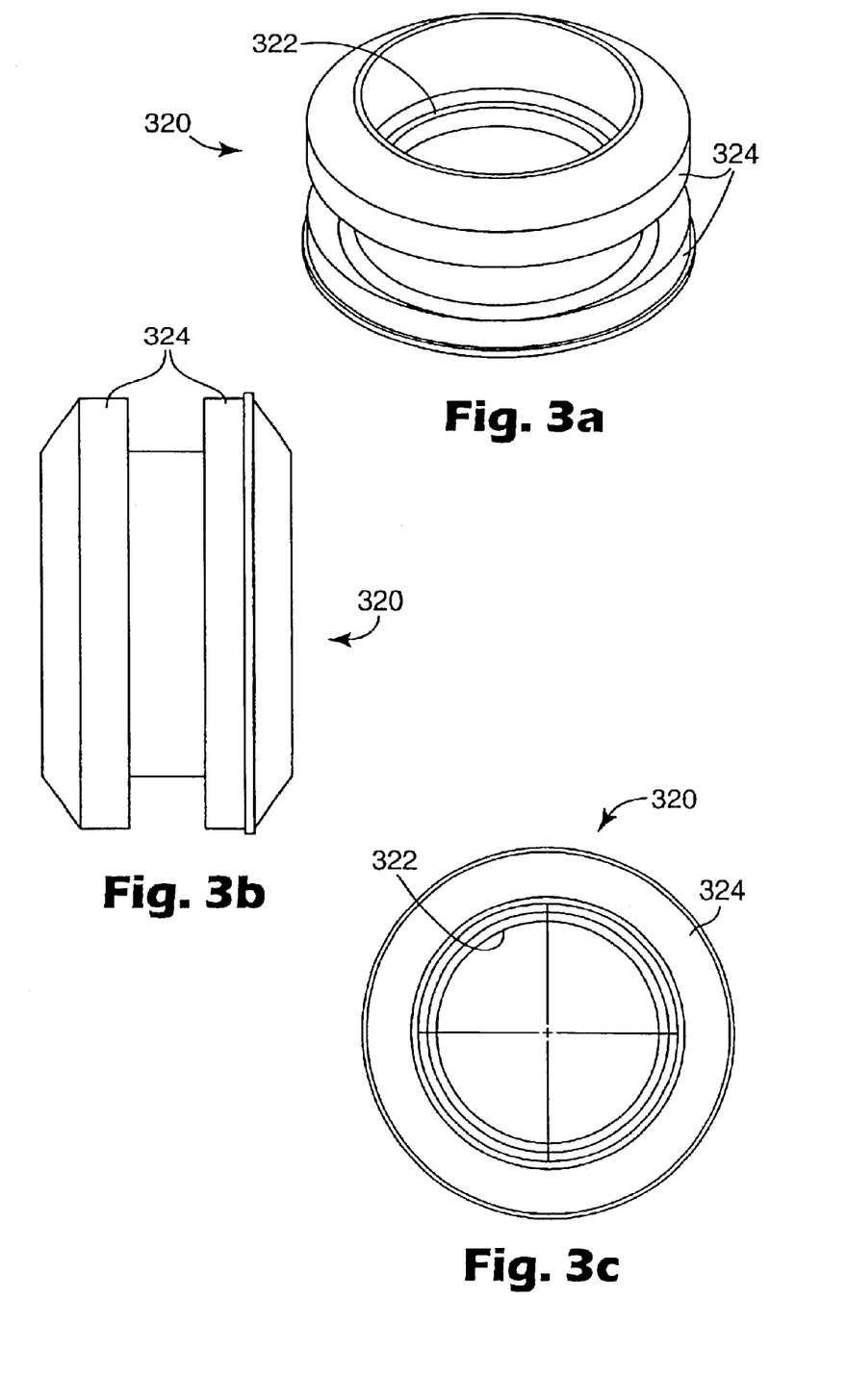

Referring to FIGS. 3a–c, shown is an exemplary mounting member 320. The mounting member includes an inner portion 322 and an outer bearing surface 324. The inner portion 322 is coupled to a horn (not shown) in its nodal region. The mounting member 320 is designed to have a natural resonant frequency at about the same (predetermined) frequency as the horn to which it is coupled. The natural frequency of the mounting member 320 has an excitable mode such that the inner portion 322 moves with the radial displacement of the horn in the nodal region. The vibrational mode shape is shown in FIGS. 5a–b. All other excitable modes (at the horn frequency), other than the one described, of the mounting member 320 must be spaced away from the operating frequency. An advantage of the example embodiment illustrated is that typically each mounting member 320 can be a unitary piece that can be shrink fitted on the horn, which is accomplished by techniques within the ordinary skill of one in the art. Typically, the shrink fit interference is about 0.001 to 0.0015 inches (0.0254 mm to 0.0381 mm) per 1.0 inch (25.4 mm) of horn diameter. Also, because the radial displacement of the outer bearing surface 324 is very low when the mounting member is vibrating at its resonant frequency, the outer bearing surface 324 can be machined for concentricity and run out requirements of the system. One applying ordinary skill in the art will appreciate that the mounting member can also be made from multiple parts that cooperate to form a structure with a predetermined resonant frequency.

Figure 8:
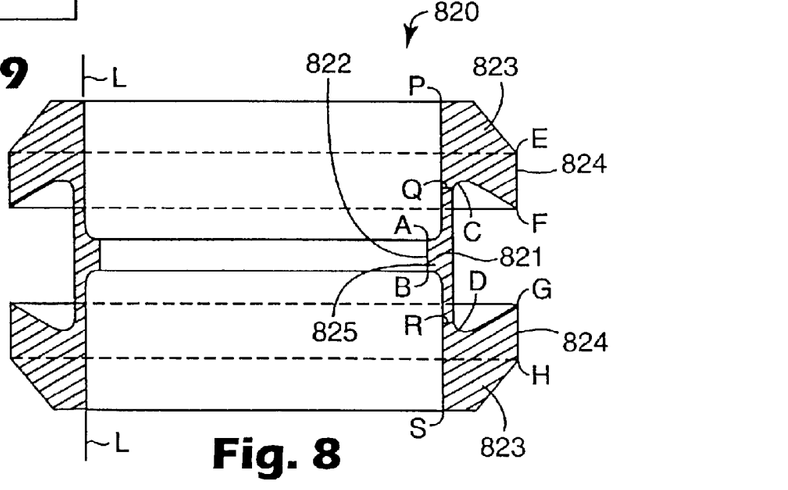
FIG. 8 is another cross-sectional view illustrating mounting member according to the present disclosure.

As was previously discussed, an advantage of the example embodiment unitary mounting member previously discussed is that it can be made of a unitary structure. While it is possible to make the mounting member from more than one piece, a unitary structure reduces the number of components, along with other advantages that are appreciated by one of ordinary skill in the art. Referring to FIG. 8, illustrated is an exemplary embodiment of a mounting member 820 of the present disclosure made out of single piece material. The material used is generally aluminum, steel, titanium, or brass. For the purpose of analysis, such as Finite Element Analysis, the mounting member 820 can be visualized and modeled using simple geometric elements. The mounting member has a circular mounting surface AB, a flexible cylinder QR, and outer surfaces EF and GH. One can visualize this as two solid rings PEFQ and GHSR connected by a flexible ring QR with ACDB as the mass at the center, forming a solid of rotation. The natural resonant frequency of the mounting member can be adjusted or tuned by varying the variables in the design, for example, the thickness of flexible cylinder, span length QR, diameters of surfaces PQ (RS) and EF (GH), central mass ACDB, and material properties, such as Young's modulus and/or density. One of ordinary skill in the art will appreciate that the particular frequency at which the horn will resonate in the mode described will depend on its particular application and operating environment. Any particular configuration can be designed and validated using Finite Element Analysis, such as PROMECHANICA from Parametric Tech. Inc., to yield similar results. In the example embodiment illustrated in FIG. 8, the mounting member 820 includes a base element 821, a pair of flanges 823 extending outwardly from the base element 821, and a mount element 825 extending inwardly towards a horn to which the mounting member 820 is coupled. The flanges 823 define an exterior bearing surface 824 that is coupled to a bearing (not shown). The base element 821 defines an interior bearing surface 822 that is coupled to a nodal region on the horn. When the interior bearing surface 822 is excited at about its natural resonant frequency, it vibrates at a maximum amplitude, and is an anti-nodal point on the mounting member 820. At the same time, the exterior bearing surface 824 is a nodal point or region and has a low or zero vibrational amplitude. Typically, the motion of the exterior bearing surface 824 is less than 15 percent of the interior bearing surface 822, and more typically, is less than 2 percent of the interior bearing surface 822.

Figure 7:
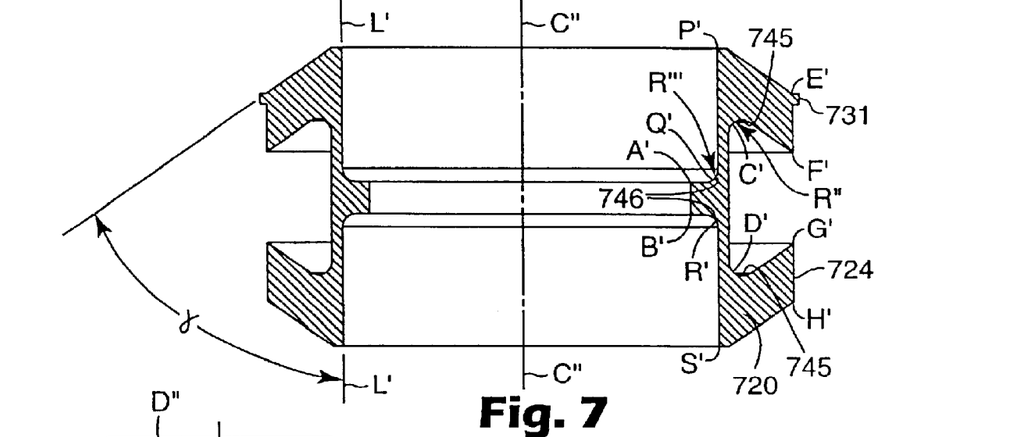
FIG. 7 is a cross-sectional view illustrating an exemplary embodiment of a mounting member having a resonant frequency of about 20,000 Hertz according to the present disclosure.

The flanges 823 extending outwardly from the base element 821 may be perpendicular (line L—L) or at an angle (as is illustrated in FIG. 7). The angle at which the flanges 823 extend is chosen to suit the particular use of the mounting member and is within the ordinary skill of one in the art. The exterior bearing surface 824 is generally parallel to the interior bearing surface 822 of the base element 821, which is typically oriented parallel to the surface of the horn to which it is coupled.

EXAMPLES

Referring to FIG. 7, a cross-section of an example embodiment of a mounting member 720 that was built and tested is shown. The mounting member 720 was made of 4140–4150 steel, though other suitable materials can be used, for example, aluminum, titanium, or brass. In this example embodiment, the mounting member 720 is a solid of revolution (around centerline C"—C") of the cross-section illustrated. The diameter of surface A'B' is 3 in., diameter of P'Q' is 3.5 in., diameter of C'D' is 3.7 inches (93.98 mm), and diameter of E'F' (G'H') is 4.9 (124.5 mm) inches. The dimension A'B', P'S', E'H' and F'G' are 0.3 (7.62 mm), 2.80 (71.12 mm), 1.95(49.53 mm), and 0.85 (21.59 mm) inches respectively. By Finite Element Analysis, the natural frequency of the desired excitable mode of the mounting member 720 (as shown in FIG. 5) was determined to be 20,054 Hz. A 0.005 inch (0.127 mm) interference was used to shrink fit the mounting member on the horn (diameter 3 inches) resulting in the diameter of surface A'B' being 2.995 (76.073) inches. The corner radius R" at each of the outer flange corners 745 is 0.125 inches (3.175 mm). The corner radius R'" at each of the inner flange corners 746 is 0.125 inches (3.175 mm). The flanges extend at an angle γ of 55 degrees from the centerline C"—C". Optionally, the mounting member 720 can also include a stop member 731, in this case a shoulder portion, protruding from the outer bearing surface 724. The stop member 731 assists in locating and securing a bearing or coupling member coupled to the mounting member.

Tests were performed on the embodiment described, the results of which are illustrated in Table 1 (with all amplitudes being peak to peak). In the first test, power draw for the system was measured for the horn alone. Power draw was then measured with two mounting members (as described) secured to the horn. The tests were done at two different booster gains, 1.5 and 2.0. The increase in power draw was less than 15 percent in both cases. The radial amplitude of vibration for both cases was negligible, being about 0.00003 inches (0.000762 mm) in the case where the booster gain was 2.0.

TABLE 1

| Frequency: 20,010 Hz | Booster 1.5 Gain | Booster 2.0 Gain |
| --- | --- | --- |
| Power Draw from System in Air Without Nodal Mounts | 250 Watts | 400 Watts |
| Power draw in air With Nodal Mounts | 275 Watts | 450 Watts |
| Input to the horn | 0.001 inches (0.0254 mm) | 0.00134 inches (0.03404 mm) |
| Radial amplitude at AB | 0.0003 inches (0.00762 mm) | 0.0004 inches (0.01016 mm) |
| Radial amplitude at EF (GH) | 0.00002 inches (0.000508 mm) | 0.00003 inches (0.000762 mm) |

The mounting member of the present disclosure can be used to mount a horn into an ultrasonic welding system. A horn having a predetermined resonant frequency is provided. Typically, the horn has a resonant frequency of 20,000 or 40,000 Hertz, though other resonant frequencies are possible. A mounting member (or mount) having a resonant frequency at about the same resonant frequency as the horn is coupled or attached to a nodal region on the horn. For a linear horn, such as the type used in plunge welding, a single mounting member is typically sufficient. For a horn having more than one nodal region, such as a rotary horn, a mounting member is attached or coupled to each nodal region of the horn. Typically, the mounting member is a solid of rotation, and is attached directly to the horn using a shrink fit. Generally, an inner portion of the mounting member, which is a typically an anti-nodal region for the mounting member, is shrink fitted directly onto the horn at the horn nodal region. The mounting member also includes an outer bearing surface or surfaces. The outer bearing surface, which is generally a nodal region for the mounting member, can be coupled or attached to a bearing, which in turn is integrated into the system to allow the horn to move. In the case of a rotary horn, the bearing(s) allow the horn to rotate during use. In the case of a linear horn, the bearing allows the horn to index against and away from the part or surface to be welded.

Although specific embodiments have been illustrated and described herein for purposes of description, it will be appreciated by those of ordinary skill in the art that a wide variety of alternate and/or equivalent implementations calculated to achieve the same purposes may be substituted for the specific embodiments shown and described without departing from the scope of the present disclosure. Those with skill in the chemical, mechanical, electromechanical, electrical, and computer arts will readily appreciate that the present disclosure may be implemented in a very wide variety of embodiments. This application is intended to cover any adaptations or variations of the exemplary embodiments discussed herein. Therefore, it is manifestly intended that this disclosure be limited only by the claims and the equivalents thereof.

What is claimed is:

1. A system for ultrasonic manufacturing, comprising:
   a horn having a resonance at a predetermined frequency, and
   a mount having a resonance at about said predetermined frequency, wherein the mount is coupled to the horn at a point where the horn has a node at said predetermined frequency.

2. The system according to claim 1 wherein the horn is a rotary horn.

3. The system according to claim 1 wherein the mount is a solid of rotation having an inner bearing surface.

4. The system according to claim 3 wherein the horn is directly coupled to the inner bearing surface.

5. The system according to claim 4 wherein the mount is shrink fit to the horn.

6. The system according to claim 3 wherein the mount comprises a base element, a pair of flanges extending outwardly from the base element, and a mount element extending inwardly from the base element.

7. The system according to claim 6 wherein the flanges have an exterior bearing surface which is a node at the predetermined frequency.

8. The system according to claim 7 wherein the motion of the exterior bearing surface is less than two percent of the motion of an interior bearing surface when the mount element is driven at the predetermined frequency.

9. A mount for ultrasonic horn, comprising:
   a base element;
   a pair of flanges extending outwardly from the base element and defining an exterior bearing surface; and
   a mount element extending inwardly from the base element and defining an interior bearing surface,
   wherein the exterior bearing surface is a node when the interior bearing surface is driven at a predetermined frequency.

10. The mount according to claim 9 wherein the motion of the exterior bearing surface is less than two percent of the motion of the interior bearing surface when the mount element is driven at the predetermined frequency.

11. The mount according to claim 10 wherein the flanges extend at an angle other than perpendicular from the base element.

12. The mount according to claim 11 wherein the exterior bearing surfaces are generally parallel to the base element.

13. A method of mounting an ultrasonic horn, comprising:
providing a horn having a resonance at a predetermined frequency, and
attaching a mount having a resonance at about said predetermined frequency to the horn at a point where the horn has a node at the predetermined frequency.

14. The method according to claim 13 wherein the horn is a rotary horn.

15. The method system according to claim 13 wherein the mount is a solid of rotation having an inner bearing surface.

16. The method according to claim 15 wherein the mount is attached to the horn such that the horn is in contact with the inner bearing surface.

17. The method system according to claim 16 wherein the mount is attached to the horn by a shrink fit.

18. The method according to claim 15 wherein the mount comprises a base element, a pair of flanges extending outwardly from the base element, and a mount element extending inwardly from the base element.

19. The method according to claim 18 wherein the flanges have an exterior bearing surface which is a node at the predetermined frequency.

20. The method according to claim 18 wherein the motion of the exterior bearing surface is less than two percent of the motion of the interior bearing surface when the mount element is driven at the predetermined frequency.

* * * * *

UNITED STATES PATENT AND TRADEMARK OFFICE
CERTIFICATE OF CORRECTION

PATENT NO.    : 6,786,384 B1
DATED         : September 7, 2004
INVENTOR(S)   : Haregoppa, Gopal B.

It is certified that error appears in the above-identified patent and that said Letters Patent is hereby corrected as shown below:

Column 3,
Line 1, after "illustrating" insert -- a --.

Column 5,
Line 29, delete "20,00" and insert in place thereof -- 20,000 --.

Column 8,
Line 20, delete "electomechanical" and insert in place thereof -- electro-mechanical --.

Signed and Sealed this

Nineteenth Day of April, 2005

JON W. DUDAS
*Director of the United States Patent and Trademark Office*